United States Patent
Ikeda et al.

(10) Patent No.: US 7,577,290 B2
(45) Date of Patent: Aug. 18, 2009

(54) IMAGE PROCESSING METHOD, IMAGE PROCESSING APPARATUS AND IMAGE PROCESSING PROGRAM

(75) Inventors: Chizuko Ikeda, Tokyo (JP); Shoichi Nomura, Hachioji (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 952 days.

(21) Appl. No.: 11/017,918

(22) Filed: Dec. 22, 2004

(65) Prior Publication Data
US 2005/0232482 A1    Oct. 20, 2005

(30) Foreign Application Priority Data
Jan. 14, 2004    (JP)    .............................. 2004-006622

(51) Int. Cl.
*G06K 9/00*    (2006.01)
(52) U.S. Cl. ........................ 382/167; 382/115; 382/118
(58) Field of Classification Search ................. 382/115, 382/117, 118, 167, 181, 190, 203
See application file for complete search history.

(56) References Cited

U.S. PATENT DOCUMENTS

| | | | |
|---|---|---|---|
| 6,754,373 B1* | 6/2004 | de Cuetos et al. | 382/118 |
| 7,340,079 B2* | 3/2008 | Segawa et al. | 382/118 |
| 2002/0018595 A1* | 2/2002 | Kwak | 382/203 |

* cited by examiner

*Primary Examiner*—Duy M Dang
(74) *Attorney, Agent, or Firm*—Finnegan, Henderson, Farabow, Garrett & Dunner, L.L.P.

(57) ABSTRACT

The image for the face candidate region is obtained, extraction conditions are determined for extracting the eye and the mouth pixels from the face candidate region based on the size of the face candidate region. The eye pixels and the mouth pixels are then extracted from the face candidate region based on the determined extraction conditions, and then the area ratio of the eyes and the area ratio of mouth are calculated for the face candidate region based on the eye pixels and the mouth pixels. Next the area ratio for the eyes and mouth is input into the neural network and a determinations is made as to whether the face candidate region is the face of a person using the neural network.

24 Claims, 12 Drawing Sheets

| x | HPF1 | LPF1 |
|---|------|------|
| -1 |     | 0.125 |
| 0 | -2.0 | 0.375 |
| 1 | 2.0 | 0.375 |
| 2 |     | 0.125 |

| i | $\gamma_i$ |
|---|------------|
| 1 | 0.66666667 |
| 2 | 0.89285714 |
| 3 | 0.97087379 |
| 4 | 0.99009901 |
| 5 | 1 |

IMAGE PROCESSING METHOD, IMAGE PROCESSING APPARATUS AND IMAGE PROCESSING PROGRAM

TECHNOLOGICAL FIELD

The present invention relates to an image processing method, an image processing apparatus and an image processing program for performing image processing for a color digital image which includes the face of a person.

BACKGROUND OF THE INVENTION

In recent years, rather than photograph prints obtained by silver salt photography, users have been viewing digital images with general use digital cameras, cameras installed on digital phones, and high function professional digital cameras, as well as scanned images from silver salt photography and the like. For digital images the level of viewer focus is high, and the standards for evaluation are exacting in the case of images that include people, and there has been an increase in the performance of correction processing for improving image quality for these images for the face region of people.

As a result, various determination technologies have been disclosed for a candidate region for the face of a person in a photographed image. All of these technologies utilize the fact that feature portions such eyes and mouth are included in face region of a person. For example, technology has been disclosed which uses the Kohonen self organization learning method, and multiple feature patterns for multiple feature regions of the face (for example the eyes and the mouth) are learned, and a determination is made as to whether the feature region of the face candidate is included in the multiple feature patterns that were learned. A determination is also made as to whether the face candidate is the face, by determining whether the positional relationship of the feature regions of face candidate is the same as the positional relationship of the feature regions of the face (for example, see Japanese Patent Application Laid-Open No. 5-282457 publication and Japanese Patent Application Laid-Open No. 6-214970 publication).

In addition, technology has been disclosed in which a face region is determined by determining a face candidate region which corresponds to the shape of the face of a person, and the using a prescribed threshold based on the features in the face candidate region (for example see Japanese Patent Application Laid-Open No. 8-63597 publication). The brightness histogram for the face candidate region has two peaks corresponding to the skin section that has a high brightness level and the eyes which have a low brightness level, and the number of pixels forming the peak at the low brightness level which corresponds to the number of pixels for the face candidate region, or in other words the frequency of the eye pixels, is considered the feature amount. The template matching method is used for extracting the eyes.

In addition, a method has been disclosed in which parts such as facial outline, hair or eyes and the like are extracted and then superimposed and used as the main candidate for photography (for example, see Japanese Patent Application Laid-Open No. 11-316845 publication). The image to be used is given a binary value, and the elliptical black region which has long axis/short axis in a prescribed range which is a feature of the eyes of an average person, is extracted as a region which can correspond to the eye region which is one of the internal structures of the face. Furthermore, the angle of the long axis for the extracted eye candidate region is determined, and the angle difference of the long axis determines the elliptical black region having the prescribed range, and this forms a pair with the eye candidate region that was first extracted and the eye candidate region is thereby extracted. In this manner, a parallel linear symmetry axis joining the centers of both eye-section candidate regions is set for each pair of the extracted eye candidate regions, and the likeness level of the linear symmetry is determined, and the black region which is estimated to be the eye in accordance with this is extracted.

In the technology described in Japanese Patent Application Laid-Open No. 5-282457 publication and No. 6-214970 publication, even the positional relationship between the feature regions are used to make the determination, and thus erroneous determination is possible if highly accurate extraction of the face candidate region is not done. For example, this is the case when multiple faces are detected as one face candidate in the typical user portrait having scenes with many faces of people close together. Also in natural images of a typical user, because there are many and various types of light sources and exposure states; expressions of persons being photographed; and photography states, processing load was large if highly accurate face extraction is to be achieved.

In the method which uses a histogram such as in Japanese Patent Application Laid-Open No. 8-63597 publication, structures other than the eyes may be detected as the eyes in error since aside from the eyes, there are other portions in the face section that have the same brightness or color value, such as the eyes such as the eyebrows or hair, the area of the face outline, and in scenes where there is a high contrast, the shadow of the nose and the like. Also in the case of group pictures that are taken in front of buildings, if the size of each persons being photographed is small, the number of pixels that comprise the mouth and eye regions is small, and extraction using the template matching method becomes difficult as a block is formed in place of structures such as the actual eyes and mouth and the like.

In the case where the size of the person who is being photographed is small and the number of pixels comprising the eye or mouth regions is small, accuracy is low for the extraction method which uses the angle of the long axis/short axis ratio of the eye portion candidate region which is described in Japanese Patent Application Laid-Open No. 11-316845 publication.

SUMMARY OF THE INVENTION

The present invention was conceived in view of the above-described problems of the prior art and the purpose thereof is to provide an image processing method, an image processing apparatus and an image processing program in which a determination can be made with high accuracy as to whether the face candidate region is the face regardless of the size of the face candidate region.

An embodiment of the present invention includes an image retrieving step for retrieving a color digital image, a face candidate region extracting step for extracting the face candidate region from the color digital image, a feature region extraction step for extracting eye pixels and the mouth pixels from the face candidate region, an area ratio calculation step for calculating the area ratio for eyes and mouth in the face candidate region, based on eye pixels and mouth pixels that were extracted, and a face determination step for determining whether the face candidate region is a face based on the area ratio of the eyes and mouth in the face candidate region.

Another embodiment of the invention includes an image retrieving section for retrieving a color digital image, a face candidate region extracting section for extracting the face candidate region from the color digital image, a feature region extraction section for extracting eye pixels and mouth pixels from the face candidate region, an area ratio calculation section for calculating the area ratio for eyes and mouth in the face candidate region based on the eye pixels and mouth pixels that were extracted, and a face determination section for determining whether the face candidate region is a face based on the area ratio of the eyes and mouth in the face candidate region.

Another embodiment of the invention is an image processing program to control a computer to function as an image processing device includes, an image retrieving function for retrieving a color digital image, a face candidate region extracting function for extracting the face candidate region from the color digital image, a feature region extraction function for extracting eye pixels and mouth pixels from the face candidate region, an area ratio calculation function for calculating the area ratio for eyes and mouth in the face candidate region based on the eye pixels, and a face determination function for determining whether the face candidate region is a face based on the area ratio of the eyes and mouth in the face candidate region.

PREFERRED EMBODIMENTS OF THE INVENTION

The following is a detailed description of the image processing apparatus 1 of an embodiment of this invention with reference to the drawings. However, the scope of this invention is not to be limited by the drawings.

<External Structure of the Image Processing Apparatus 1>

First the image processing apparatus 1 of an embodiment of this invention will be described.

Figure 1:
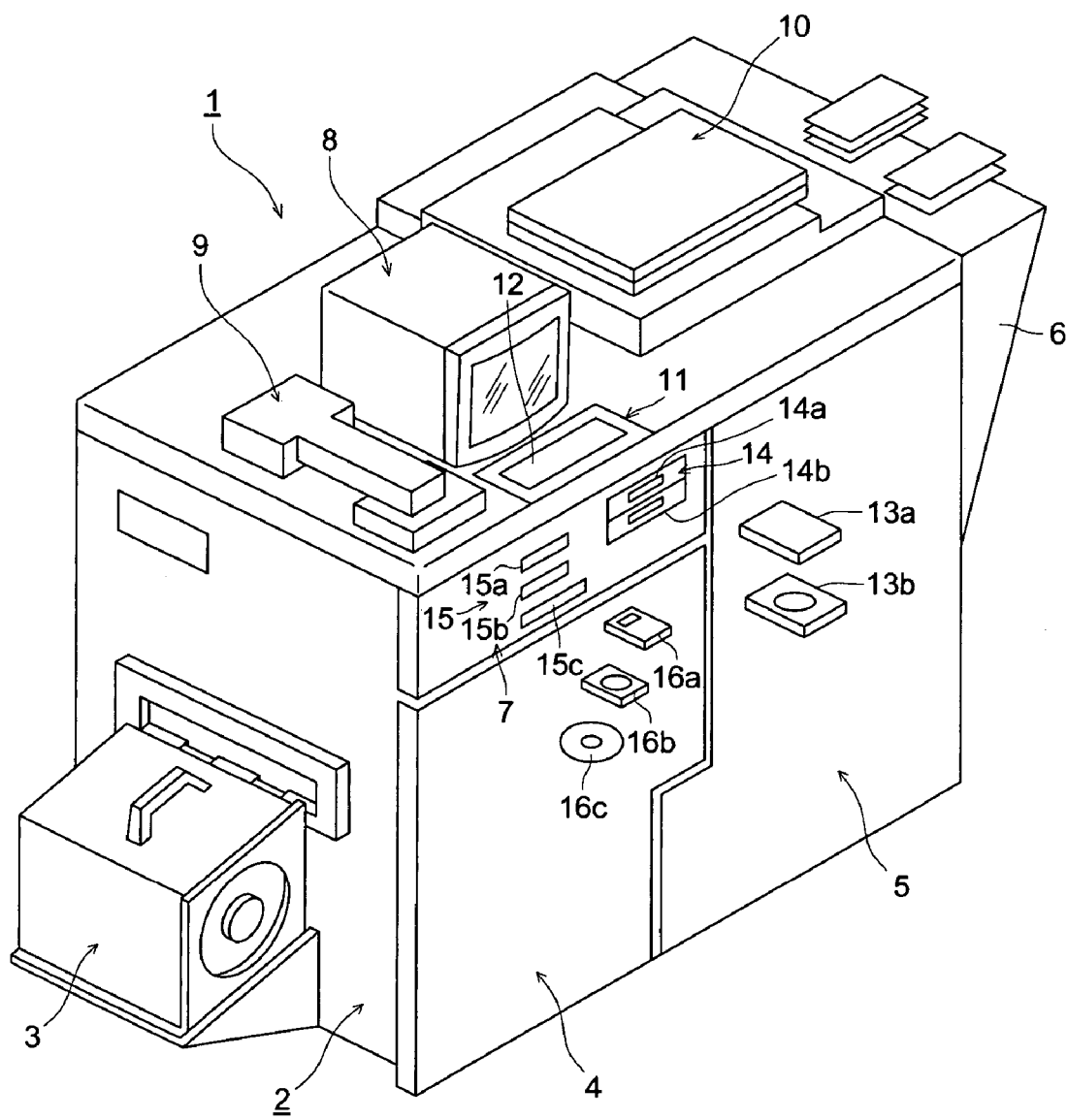
FIG. 1 is a perspective view showing the schematic structure of the image processing apparatus 1 of an embodiment of this invention.

FIG. 1 is a perspective view of the overall structure of the image processing apparatus 1.

As shown in FIG. 1, the image processing apparatus 1 includes a magazine loading section 3 for loading photosensitive material on one side surface of the main body 2. Inside the main body 2, there is an exposure processor 4 for exposure to a photosensitive material and a print creation section 5 for subjecting the exposed photosensitive material to developing processing and then drying to thereby create prints. The prints that are created are discharged to the tray 6 which is provided on the other side surface of the main body 2.

In addition, the upper section of the main body includes a CRT (Cathode Ray Tube) 8 as the display device; a film scanner section 9 which is a device for reading transparent originals; a reflective original input device 10; and an operation section 11. Furthermore, the main body 2 includes an image reading section 14 which is capable of reading image information that is recorded on various types of digital recording media and an image writing section 15 which is capable of writing (outputting) image signals to the various types of digital recording media. In addition, a control section 7 which performs central controlling of each section is inside the main body 2.

The image reading section 14 includes a PC card adaptor 14a and the floppy (registered trademark) disk adaptor 14b which are pluggable into the PC card 13a and the floppy disk 13b. The PC card 13a has memory in which multiple image data photographed by a digital camera is recorded. The floppy disk 13b has, for example, multiple image data which is photographed by a digital camera recorded thereon. Additional examples of recording media having image data include multimedia card, memory stick, MD (Mini Disc) data and CD-ROM (Compact Disc Read Only Memory).

The image writing section 15 includes a floppy disk adaptor 15a, a MO adaptor 15b, and an optical disk adaptor 15c, and each of the FD 16a, the MO 16b, and the optical disk 16c can be plugged in, and image information can be written on image recording media. Examples of the optical disk 16c include CD-R (Compact Disc-Recordable) and DVD-R (Digital Versatile Disc-Recordable) and the like.

It is to be noted that in FIG. 1, the operation section 11, the CRT 8, the film scanner section 9, the reflective original input device 10 and the image reading section 14 are provided so as to be integral with the main body 2, but they may also be provided as more than one separate devices.

Incidentally, in the example of the image processing apparatus 1 shown in FIG. 1, exposure is performed on a photosensitive material and then development is done and the print is created. However the method for creating the print is not limited to this method and inkjet printing, electrophotographic printing, thermal printing, or a sublimation method may be used.

<Internal Configuration of the Image Processing Apparatus 1>

Figure 2:
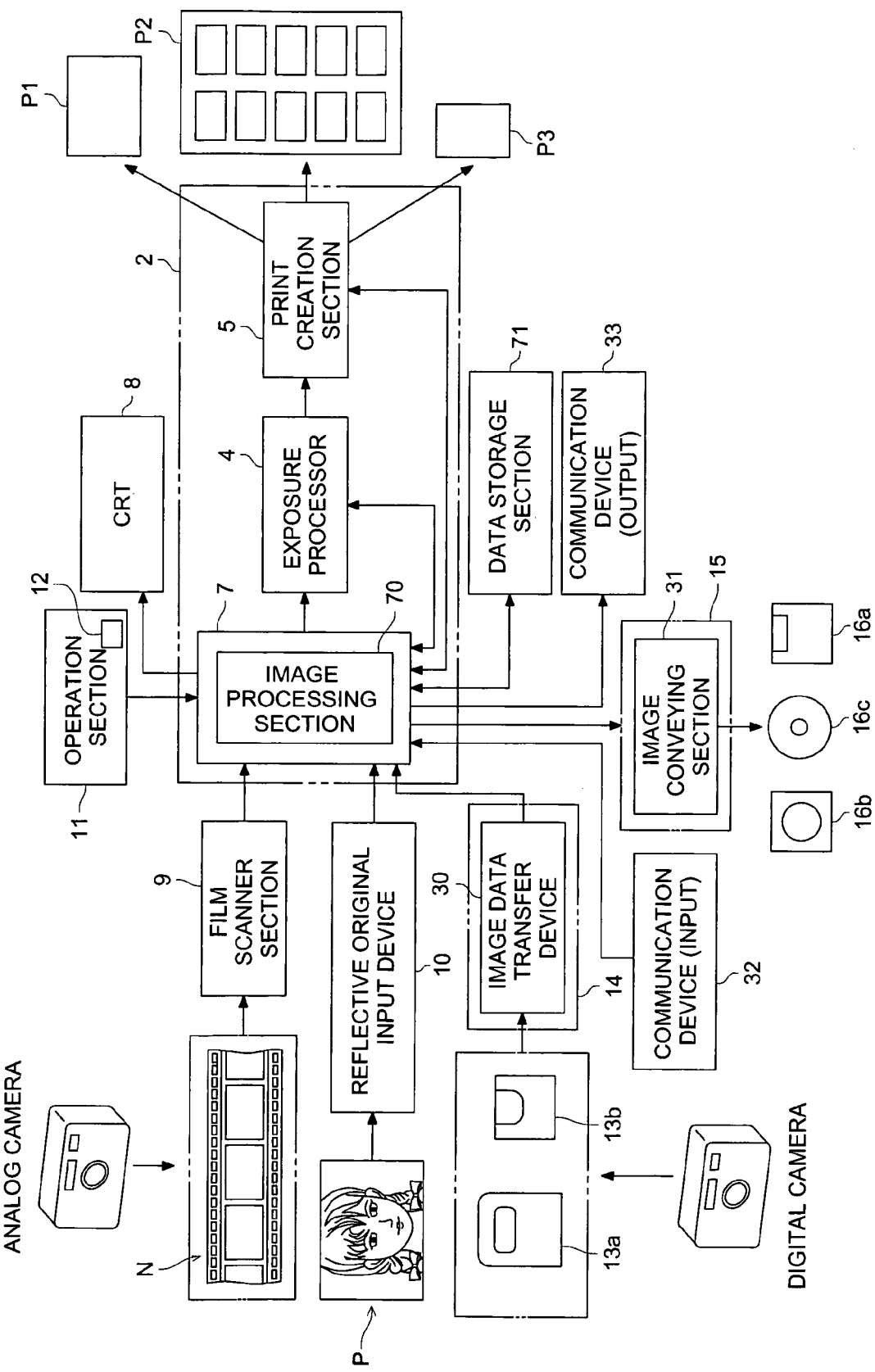
FIG. 2 is a block diagram showing the internal structure of the image processing apparatus 1.

FIG. 2 is a block diagram showing the internal configuration of the image processing apparatus 1. As shown in FIG. 2, the image processing apparatus 1 comprises: a control section 7; an exposure processor 4; a print creation section 5; a CRT 8, a film scanner 9; a reflecting original input device 10; a operation section 11; an image reading section 14; an image writing section 15; a communication device (input) 32; a communication device (output) 33; and a data storage section 71.

The control section 7 comprises a microcomputer, and the various control programs such as an image processing program and the like which are recorded in the storage section (not shown) such as the ROM (Read Only Memory) and the like, and the CPU (Central Processing Unit) (not shown) work in tandem to take overall control of the operations of each of the sections comprising the image processing apparatus 1.

The control section 7 has an image processor 70 and image processing is done and image data for output is created for image data that is obtained by the film scanner section 9 or the reflection original input device 10, the image data read from the image reading section 14, and the image data that is input via the communication device (input) 32 from external devices based on the input signals (command information) from the control section 11, and this is output to the exposure processor 4. The image processor 70 also performs conversion processing of the image data that has been subjected to image processing in accordance with the form of the output. The image processor 70 sends its output to the CRT 8, the image writing section 15, the communication device (output) 33 and the like.

The exposure processor 4 exposes the images on the photosensitive material, and this photosensitive material is output to the print creation section 5. The print creation section 5 subjects the exposed photosensitive material to development processing and drying and creates prints P1, P2 and P3. The print P1 is the service size, the high vision size, the panorama size or the like, while the print P2 is the A4 size and the P3 is the business card size.

The film scanner section 9 reads image data recorded on transparent originals such as developed negative film or reversal film and the like which was used for photographing by an analog camera.

The reflective original input device 10 reads image formed on a print P (photographic print, written document and various printed materials) using a flatbed scanner that is not shown.

The operation section 11 comprises an information input section 12. The information input section 12 may comprise a touch panel for example, and the pressed signals from the information input section 12 are output to the control section 7 as input signals. It is to be noted that the operation section 11 may also have a keyboard and a mouse and the like. The CRT 8 displays image data and the like in accordance with display control signals input from the control section 7.

The image reading section 14 comprises a PC card adaptor 14a and a floppy disk adaptor 14b and the like as the image data transfer device 30, and the image data that is recorded on the PC card 13a that is inserted on the PC card adaptor 14a or on the floppy disk 13b that is inserted in the PC card adaptor 14b is read and transferred to the control section 7. A PC card reader or a PC card slot and the like are used as the PC card adaptor 14a.

The image writing section 15 comprises a floppy disk adaptor 15a, a MO adaptor 15b, and an optical disk adaptor 15c as the image conveying section 31. The image writing section 15 writes created image data in accordance with the write signals input from the control section 7, to the floppy disk 16a which is plugged into the floppy disk adaptor 15a, the MO16b which is plugged into the MO adaptor 15b, and the optical disk 16c which is plugged into the optical disk adaptor 16c.

The communication device (input) 32 receives image data which displays photographed images or print command signals from a distant computer via a separate computer within the facility which is installed in the image processing apparatus 1 or via the internet and the like.

The communication device (output) 33 sends image data which displays photographed images after image processing has been performed and order information to a distant computer via a separate computer within the facility which is installed in the image processing device 1 or via the internet and the like.

The data storage section 71 records and sequentially stores image data and the corresponding order information (information on how many prints are be made from what frames and print size and the like).

<Configuration of Image Processor 70>

Figure 3:
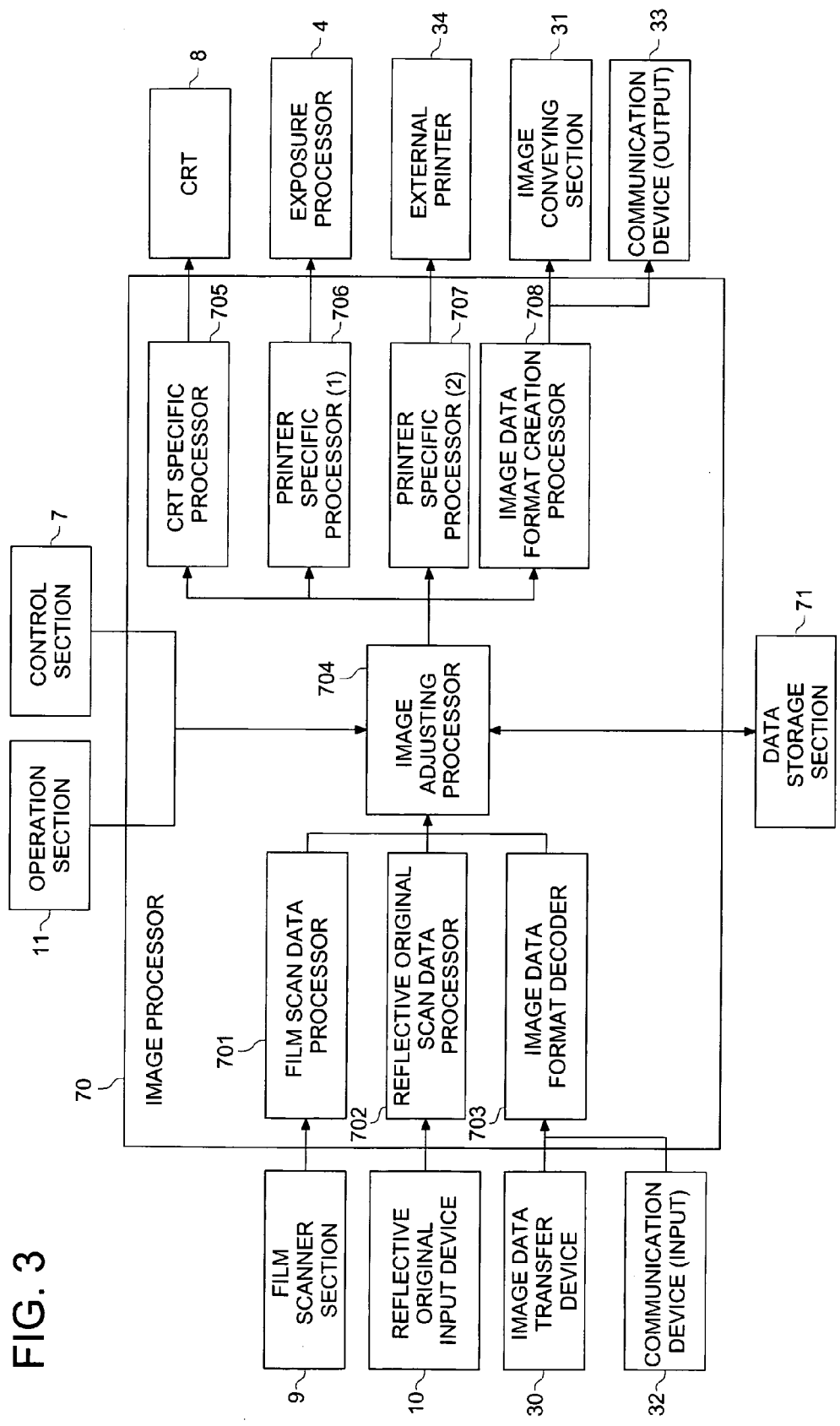
FIG. 3 is a block diagram showing the functional structure of the image processor 70 of the image processing apparatus 1.

FIG. 3 is a block diagram showing the functional structure of the image processor 70 of the image processing apparatus 1. As shown in FIG. 3, the image processor 70 comprises: a film scan data processor 701; a reflective original scan data processor 702; an image data format decoding processor 703; an image adjustment processor 704; a CRT specific processor 705; a printer specific processor (1) 706; printer specific processor (2) 707; and an image data format creation processor 708.

The film scanning data processor 701 subjects the image data input from the film scanner section 9 to film scanner section 9 specific correction operation/negative-positive reversal in the case of negative originals, dust-induced flaw removal, gray balance adjustment, contrast adjustment, particulate noise removal and sharpness adjustment and then outputs to the image adjustment processor 704. The film scanning data processor 701 outputs data on film size, negative/positive type, ISO (International Organization for Standardization) sensitivity that is recorded either optically or magnetically on the film, the name of the maker, information relating for the main subject being photographed, information relating to photographing conditions (such as the content of information for APS (Advanced Photo Systems)) and the like to the image adjustment processor 704.

The reflective original scan data processor 702 subjects the image data input from the reflective original input section 10 to reflective original input section 10 specific correction operation, negative-positive reversal in the case of negative originals, dust-induced flaw removal, gray balance adjustment, contrast adjustment, particulate noise removal, sharpness adjustment and the like, and then outputs to the image adjustment processor 704.

The image data format decoding processor 703 decodes compression encoding and converts the display method for color data if necessary, in accordance with the data format of the image data that is input from the image data transfer device 30 or the communication device (input) 32, and does conversion to a suitable data format based on the calculations in the image processor 70, and then outputs to the image adjustment processor 704.

The image adjustment processor 704 performs various image processing for images received from the film scanner section 9; the reflective original input device 10; the image data transfer device 30; and the communication device (input) 32 based on commands from the operation section 11 or the control section 7, and processed image signals are output to the CRT specific processor 705; the printer specific processor (1) 706; printer specific processor (2) 707; the image data format creation processor 708; and he data storage section 71. In particular, the image adjustment processor 704 functions as the face candidate region extracting section, the extraction condition determining section; the feature region extraction section; the area ratio calculation section; the face determining section; and the correction processing section.

The CRT specific processor 705 performs processing such as changing of the pixel number and color matching and the like where necessary, for the image data that is input from the image adjustment processor 704, and the image data for display which is combined with necessary data necessary for display of control information and the like is output to the CRT 8.

The printer specific processor (1) 706 performs printer specific correction processing, color matching and pixel number adjustment and the like where necessary in accordance with the image data input from the image adjustment processor 704, and outputs to the exposure processor 4.

In the case where the image processing apparatus 1 is connected to an external printer 34 such a large-sized inkjet printer, a printer specific processor (2) 707 is provided for each connected printer. The printer specific processor (2). 707 performs appropriate printer specific correction processing, color matching and pixel number adjustment for the image data that is input from the image adjustment processor 704.

The image data format creation processor 708 converts the image data input from the image adjustment processor 704 where necessary, to various typical general use image formats such as JPEG (Joint Photographic Experts Group), TIFF (Tagged Image File Format), Exif (Exchangeable Image File Format) and the like, and outputs to the image conveying section 31 or the communication device (output) 33.

It is to be noted that the divisions such as: the film scan data processor 701; the reflective original scan data processor 702; image data format decoding processor 703; the image adjustment processor 704; the CRT specific processor 705; the printer specific processor (1) 706; printer specific processor (2) 707; and the image data format creation processor 708 are provided to assist with the understanding of the functions of the image processor 70 and are not necessarily realized as physically independent devices, and for example may be realized as various software processing divisions in one CPU. Also the image processing apparatus 1 of this embodiment is not to be limited to that described above, and may have various forms including that of a digital photo printer, a printer driver; plug-ins for various image processing software and the like.

Next, the operation of the image processing apparatus 1 will be described.

First the overall outline of the image processing performed in the image adjustment processor 704 will be described.

The color digital image which is to be subjected to face determination processing is obtained via the film scanner section 9, the reflective original input device 10, image data transfer device 30 and the communication device (input) 32 or the like (Step A1), and face candidate regions (N regions) are extracted from the obtained color digital image (Step A2). If the face candidate region is not extracted (NO in Step A3), the processing ends.

The method for extracting the face candidate region is not particularly limited, but a method in which color values such as brightness, chromaticness or hue are used and the face region is defined as a prescribed range in which a particular color is continuous; a method in which the edges are extracted from an image to extract a specific pattern such as an ellipse or the like, a method in which pattern matching or neural network is used; or a combination of the above methods or the like may be used.

For example, in the method disclosed in Japanese Patent Application Laid-Open No. 4-346332, an original image is divided into a multiple pixels and a histogram of hue value and chromaticness value is created from the BGR value of each pixel; and the histogram is divided based on the configuration, and the image is divided into regions which comprise each pixel and are equivalent to the regions into which the histogram has been divided; and regions equivalent to the face region are estimated from the plurality of divided regions. The method disclosed in Japanese Patent Application Laid-Open No. 6-309433 publication, Japanese Patent Application Laid-Open No. 6-67320 publication, Japanese Patent Application Laid-Open No. 5-158164 publication; and Japanese Patent Application Laid-Open No. 5-165120 publication is a method in which skin region is determined based on histograms of hue value, chromaticness value, luminance value and the like, and the skin region is considered the face region. Japanese Patent Application Laid-Open No. 8-184925 publication which discloses a method in which the image is subjected to binary processing or the like and divided into multiple regions, and the region which is most likely to correspond to the face region is extracted, and methods using the line process method which is disclosed in Japanese Patent Application Laid-Open-No. 8-221567 publication, Japanese Patent Application Laid-Open No. 2000-20694 publication, Japanese Patent Application Laid-Open No. 2000-32272 publication, Japanese Patent Application Laid-Open No. 2000-201358 publication, and Japanese Patent Application Laid-Open No. 2000-207569 publication are given as examples.

Also, a region may be extracted such that edges and low frequency images may be formed from the color digital image; initial pixels are extracted in which the prescribed parameters (for example, the values for chromaticness, hue, and brightness) match the prescribed initial conditions (the values for the prescribed ranges); simple region enlargement is performed from the initial pixels that have been extracted for the low frequency images; and then simple region enlargement is brought to an end when the edge of the image is reached. Furthermore, region extraction may be performed by logarithm polar coordinate conversion of the image mainly for the pixels of the eye region of the person in the image; and simple region enlargement is done using the image that has been subjected to logarithm polar coordinate conversion; and pattern matching is done using a template for face region extraction from the image that has been subjected to logarithm polar coordinate conversion.

In addition, in the case where the level of difficulty of extracting the face candidate region in particular is high, the operator may manually set the face candidate region on the monitor using a mouse or a writing pen or the like.

After extraction of the face candidate region (YES in Step A3), a determination is made as to whether the $i^{th}$ face candidate region (i=1–N) is a face (Step A4). The details of the face determination processing will be described hereinafter (see FIG. 5). In the face determination method which is based on the area ratio of the eye and mouth in this invention, the area ratio is compared with a prescribed threshold value. Alternatively, known technology in the industry such as a prescribed table or a determination formula may be used, but it is particularly preferable that the face determination is performed using a neural network.

If the face candidate region is determined to be a face (YES in Step A5), said face candidate region is subjected to correction processing (Step A6). The content of the correction processing is not limited, but it is preferable that smoothing processing for skin color regions that correspond to the skin, and highlighting processing for edges that correspond to the face outline and the eyes and the like are performed, and image processing conditions for improving the appearance of the face are determined, and image processing is performed based on these image processing conditions. Moreover, it is also preferable to perform gradation conversion processing to the whole image region so that the concentration of the extracted face candidate region turn into proper concentration. If a determination is made that the face candidate region is not a face (NO in Step A5), then Step A7 is next.

Next a determination is made as to whether processing has been performed for all of the N face candidate regions (Step A7), and in the case where there are face candidate regions that have not been processed, (NO in Step A7), the processing in Steps A4-A6 are repeated. In the case where processing has been performed for all N face candidate regions (YES in Step A7), the processing ends.

Figure 4:
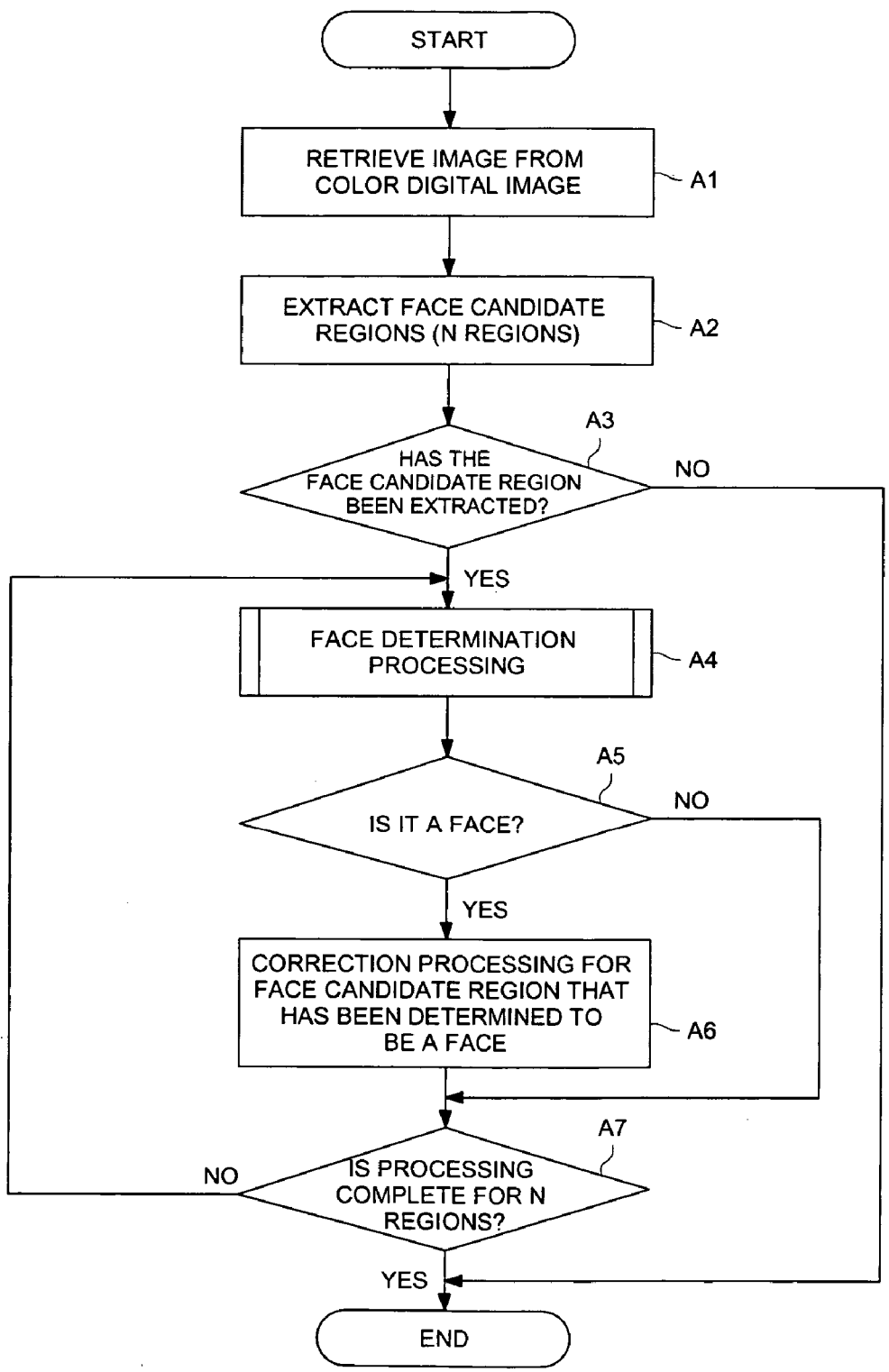
FIG. 4 is a flowchart showing the overall outline of the image processing performed at the image adjusting processor 704.

In the flowchart of FIG. 4, face determination processing is performed for one face candidate region, and in the case where a determination is made that it is a face, the correction processing is performed and this is repeated N times, but face determination processing may be performed N times beforehand, and the determination results stored in a prescribed memory, and then the correction processing is performed all at once for the face candidate regions that have been determined to be a face.

Figure 5:
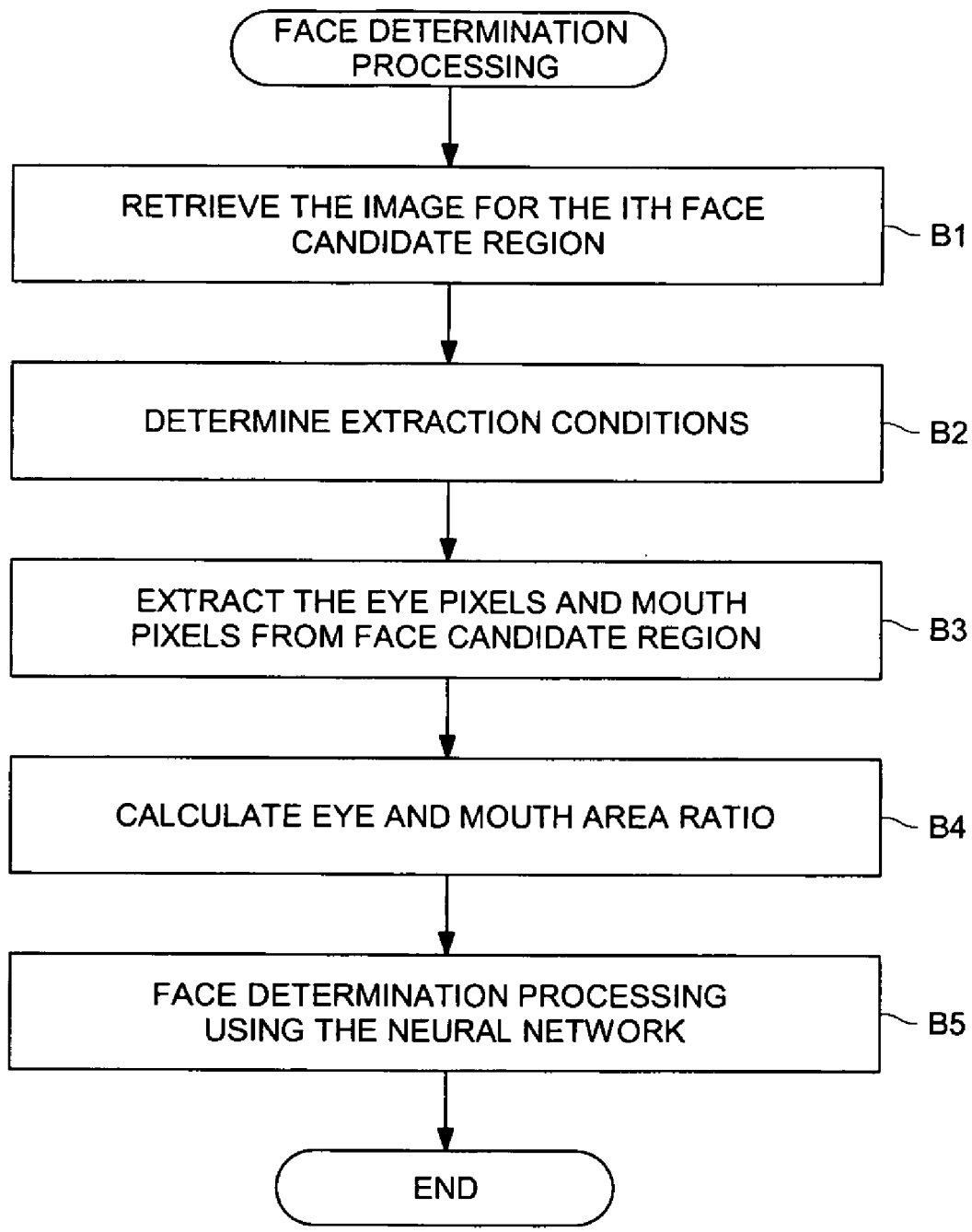
FIG. 5 is a flowchart showing the face determining processing.

Next, the face determination processing (Step A4) is described with reference to FIG. 5.

First the image for the $i^{th}$ (i=1-N) face candidate region is obtained (Step B1), extraction conditions are determined for extracting the eye pixels and the mouth pixels from the face candidate region based on the size of the face candidate region (Step B2). The eye pixels and the mouth pixels herein refer to pixels that are assumed to correspond with eyes and mouth in the face candidate region.

The extraction conditions include both the extraction method and the extraction conditions such as the numerical values (coefficients) of the extraction method. If the face candidate region comprises a large number of pixels, the pixels comprising the iris and the pupil can be distinctly separated, but in the case where there are a small number of pixels, the iris and the pupil blend with the surrounding skin, and have a block-like shape. As a result, depending on the size of (number of pixels comprising) the face candidate region, the features of the eyes and mouth may differ. By changes the extraction conditions in accordance with the size of the face candidate region, the eyes and the mouth can be accurately extracted regardless of the size of the face candidate region.

The size of the face candidate region is divided into large, medium and small using preset threshold values, and in the case where the size of the face candidate region is large, there is a clear distinction between the iris and the pupil of the eyes, and thus as described above, the pupil is extracted using edge information and color information by Hough conversion. In the case where the pupil is extracted, it may also be extracted from ranges with low brightness (black ranges). The color information herein refers to the color information signals obtained when the image signals which display the image are converted to luminance signals and color information signals.

In the case where the size of the face candidate region is about medium, both the eye candidate pixels obtained from the edge information by luminance and the eye pixels from the color information are considered eye pixels.

In the case where the size of the face candidate region is small, the edge cannot be detected as the outline of the eye, and thus the eye determination is made based on only the color information. In this case, the determination is affected by the skin color surrounding the eye, and thus it is preferable that the range of brightness for which the color determination is made is extended.

The eye pixels and the mouth pixels are then extracted from the face candidate region based on the determined extraction conditions (Step B3). The details of the eye pixel and the mouth pixel extraction processing will be described hereinafter (see FIG. 8). It is preferable that the eye pixel and the mouth pixel extraction is performed using both the color information and the edge information.

Next, the area ratio of the eyes and mouth is calculated for the face candidate region based on the eye pixels and mouth pixels (Step B4). The eye and mouth area ratio is a parameter which indicates the ratio of the number of pixels comprising the face candidate region that is accounted for by the eye pixels and the mouth pixels. For example, in the simplest case, the area ratio=number of pixels of the extracted feature region (eyes or mouth)/number of pixels comprising the face candidate region. In order to improve suitability of the face determination method or the accuracy of determination, a prescribed coefficient may be specified and conversion processing may be performed using a prescribed conversion formula such as logarithm conversion and the like.

A determination is then made as to whether the face candidate region is the face of a person using a neural network (Step B5). More specifically, the eye and face area ratio is input into a neural network and the output is a parameter indicating likeness to a face.

Figure 6:
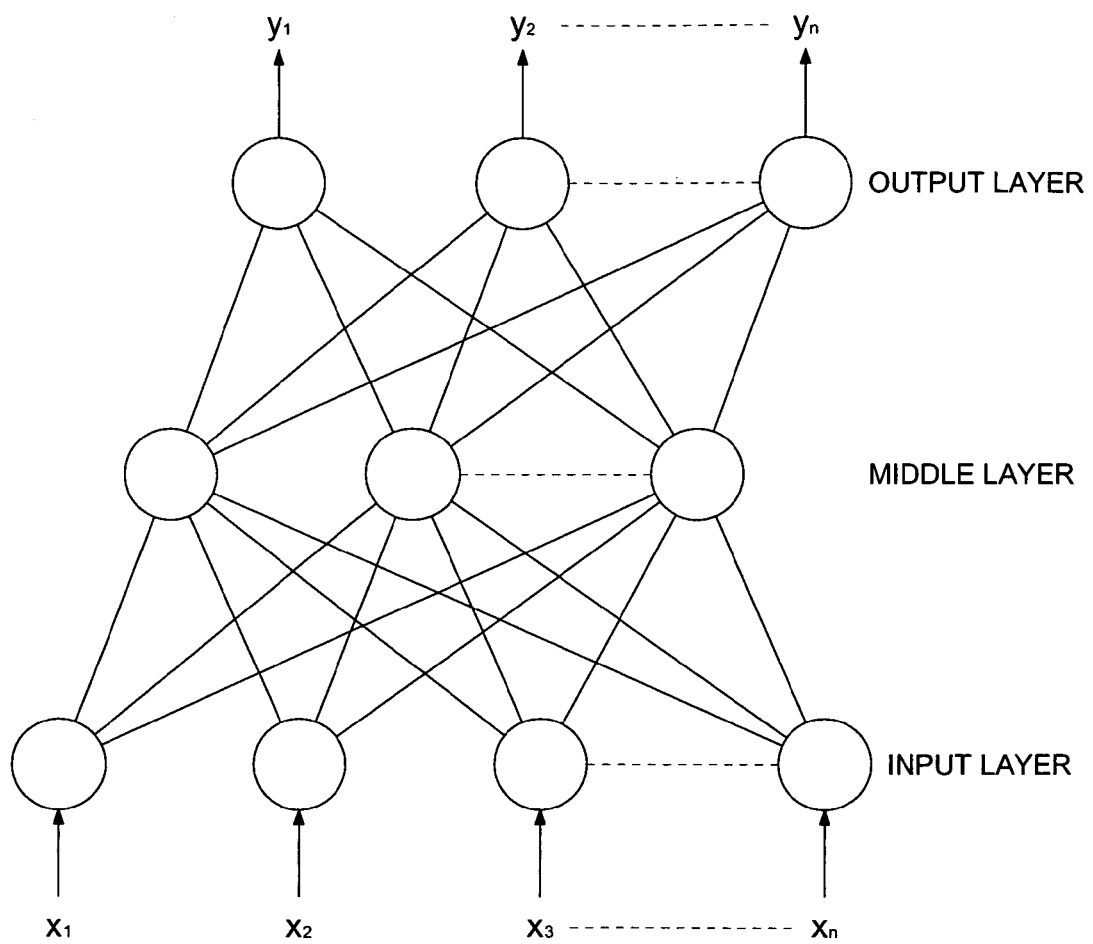
FIG. 6 is an explanatory diagram showing the pattern structure of a multilevel neural network.

As shown in FIG. 6, the neural network is a multilevel neural network which includes an input layer, a middle layer, and an output layer (simply referred to as neural network). The neural network preferably uses a digital neural network chip, but a general-use DSP (Digital Signal Processor) and a dedicated emulator program may also achieve the same functions and thus a normal CPU and an emulator program may be used.

Figure 7:
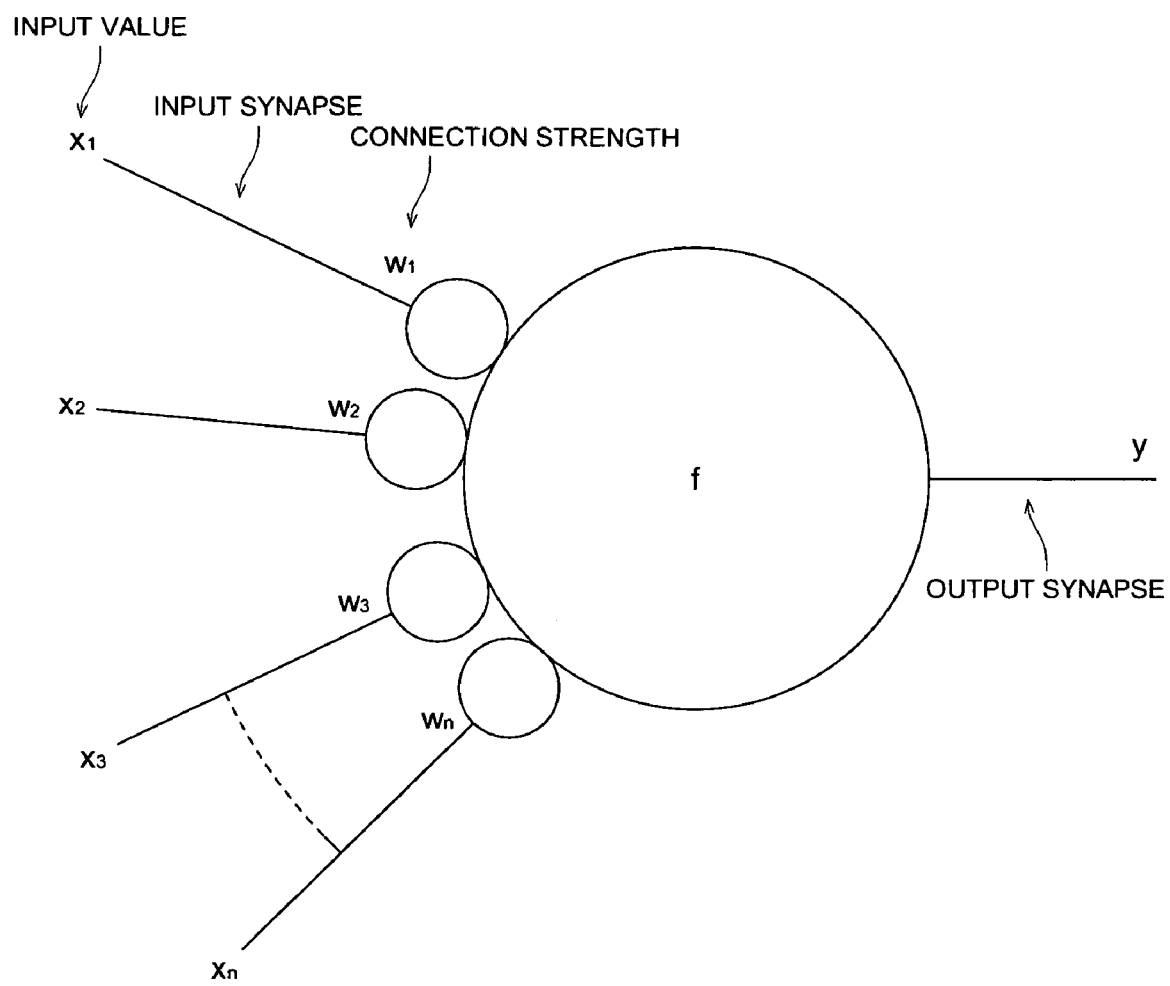
FIG. 7 is an explanatory diagram showing the pattern of a neuron.

Each layer of the neural network is formed of a component unit called a neuron. Except for in the input layer, any suitably selected neuron receives a number of inputs called synapses as shown in FIG. 7, and for each input value $x_i$, a prescribed weight $w_i$ which is called the connection intensity is applied and the total thereof is determined, and this functions as functional element which is given as output y which is evaluated using the prescribed output function f.

[Equation 1]

$$y = f\left(\sum_{i=1}^{n} w_i \cdot x_i\right) \quad (1)$$

A non-linear sigmoid function is usually used as f(x), but f(x) is not necessarily limited thereto.

[Equation 2]

$$f(x) = \frac{1}{1 + \exp(-a \cdot x)} (a \neq 0) \quad (2)$$

The input weight $w_i$ of each neuron herein is important information for determining the relationship between the input and output of the neural network, or in other words the operation of the neural network. The input weight $w_i$ is determined by the learning operation for the neural network. It is to be noted that in FIG. 6, the middle layer is shown as only one layer, but the middle layer may have a suitably selected multilevel structure having more than one layer. In the multilevel network, it is known that if the middle level only has one layer, a suitably selected synthesizable function can be realized, but it is also known that a multilayer middle level is advantageous in view of learning efficiency and the number of neurons.

The neural network has the following features. (1) It has a relatively simple structure while realizing many input and many output non-linear systems. (2) The neurons in each of the layers can be caused to operate independently, and high speed operation can be expected from serial processing. (3) By providing suitable training data and doing training, suitably selected input and output relationships can be realized. (4) The system has function capabilities. In other words, training data is not necessarily provided, and even for an unlearned input pattern, the system is capable of generally correct output.

The training data herein is the input pattern and the desired output pattern for that pattern, and usually a plurality of training data is provided. The operation for determining a desired output pattern for specific input data is generally dependent on an objective determination by the learner. The main applications for the neural network are (a) non-linear relationship approximation and (b) clustering (identification, recognition and classification).

Generally, a non-linear function approximation is easily achieved, and it is easy to obtain function capability. Meanwhile application of clustering is highly dependent on training data, and for complex input, there is a strong possibility that there is conflicting relationship between the respective training data. As a result, when clustering is put into practice, except for cases where the input is extremely simple, not only is the resulting function capability low, but an unsatisfactory system is often obtained in terms of suitability of the specified training data.

Next, the learning method which uses training data for the neural network will be described. For the input pattern for the $p^{th}$ program, the neuron state of the $i^{th}$ L layer is expressed in the following manner.

[Equation 3]

$$Y_{iL}(p) = f(U_{iL}(p)) \quad (3)$$

[Equation 4]

$$U_{iL}(p) = \sum_j w_{ij}\langle L-1 \rangle Y_i\langle L-1 \rangle(p) \quad (4)$$

The function f(x) is the non-linear sigmoid function shown in Equation (2); $Y_{iL}$ is the neuron output, $U_{iL}$ is the internal state of the neuron; $Y_i$<L-1> which is the neuron output of the L-1 layer=neuron input of the L layer; and $w_{ij}$ <L> is the connection intensity.

When defined in this manner, in the widely used back propagation learning method (simply referred to as learning method hereinafter), the error E is defined in the following manner using the mean square error as the error evaluation function.

[Equation 5]

$$E = \frac{1}{2}\sum_p \sum_i (Y_{ik}(p) - T_i(p))^2 \quad (5)$$

It is to be noted that k is the number of the output layer, and $T_I(p)$ is the desired output pattern for the $p_{th}$ input pattern.

In this case, the correction amount Δw for each connection intensity is determined using the following equation based on the BP method.

[Equation 6]

$$\Delta w_{ij}\langle L \rangle = -\eta \cdot \frac{\partial E}{\partial w_{ij}\langle L \rangle} \quad (6)$$

δ is the partial differential symbol (round) and η is the coefficient showing the learning rate. Learning progresses as a result of Δw being increased to each value for $w_{ij}$ <L>. It is to be noted that when learning progresses in the BP method of this type, when the absolute value of the error in the training data decreases, the absolute value of the Δw also decreases and the learning ceases to progress, and various improvements have been proposed for circumventing this problem.

It is proposed for example, that the definition of Δw be changed in the following manner.

[Equation 7]

$$\Delta w_{ij}\langle L \rangle = -\eta \cdot \frac{\partial E}{\partial w_{ij}\langle L \rangle} + \alpha \Delta w_{ij}\langle L \rangle \quad (7)$$

The second item in Equation (7) is called inertia (momentum) and it suppresses vibration at convergence time by taking not only the current correction amount, but also to the past correction amounts into consideration, and this has the effect of allowing high speed learning. The stabilizing constant α is a positive real number that is 1.0 or less and is a coefficient which specifies the extent to which the past correction value is taken into consideration.

Alternatively, it has been proposed that the learning rate η is varied dynamically so as to satisfy the following equation in accordance with the learning frequency n.

[Equation 8]

$$\frac{\partial E(n)}{\partial \eta(n)} = 0 \quad (8)$$

In addition, it has been proposed that error evaluation is done by a format in which a derivative of the sigmoid function is negated rather than by mean square error. Approximate output for the training data can be obtained because the frequency learning operation is performed satisfactorily in either case.

The neural network used herein preferably comprises a multilevel neural network that has: an input layer for inputting the area ratios for at least the eyes and mouth; one or more middle layers; and an output layer for outputting a parameter indicating at least likeness to a face.

Next, the feature region extraction processing (Step B3) will be described with reference to FIG. 8. In the example which is described herein, the face candidate region has a size which larger than a preset size and the pupils are extracted as the eye pixels.

First the image signals indicating the image for the face candidate region that has been obtained is converted to luminance signals and color information signals (Step C1).

The operation for converting the image signals into luminance signals refers, for example, to converting the 3 color intensity signals for the 3 colors B, G and R of the original image into YIQ base, HSV base, and YUV base, or to converting to the L*a*b* base and the L*u*v* base and the like which are recommended by the XYZ base of the color system CIE 1931 and the CIE 1976 based on the sRGB or the NTSC specifications. Even if the division into the luminance signals and the color information signals is not a completely strict color theory conversion, satisfactory results are seen, and thus as disclosed in Japanese Patent Application Laid-Open No. 63-26783 publication, the conversion in which the BRG average value is used as the luminance signals and the 2 axes which intersect the BRG average value is used as the color information signals.

Next, the edge is extracted using the luminance signals and the edge information is created (Step C2). The edge information is information showing the outline of (edge) of the structures present in the image and it indicates the position and intensity of the edges. There are various known edge extraction methods which include filter processing using the Sobel filter, and dividing the image into frequency region components and extracting the edges, but the edge extraction method is not particularly limited.

Figure 9:
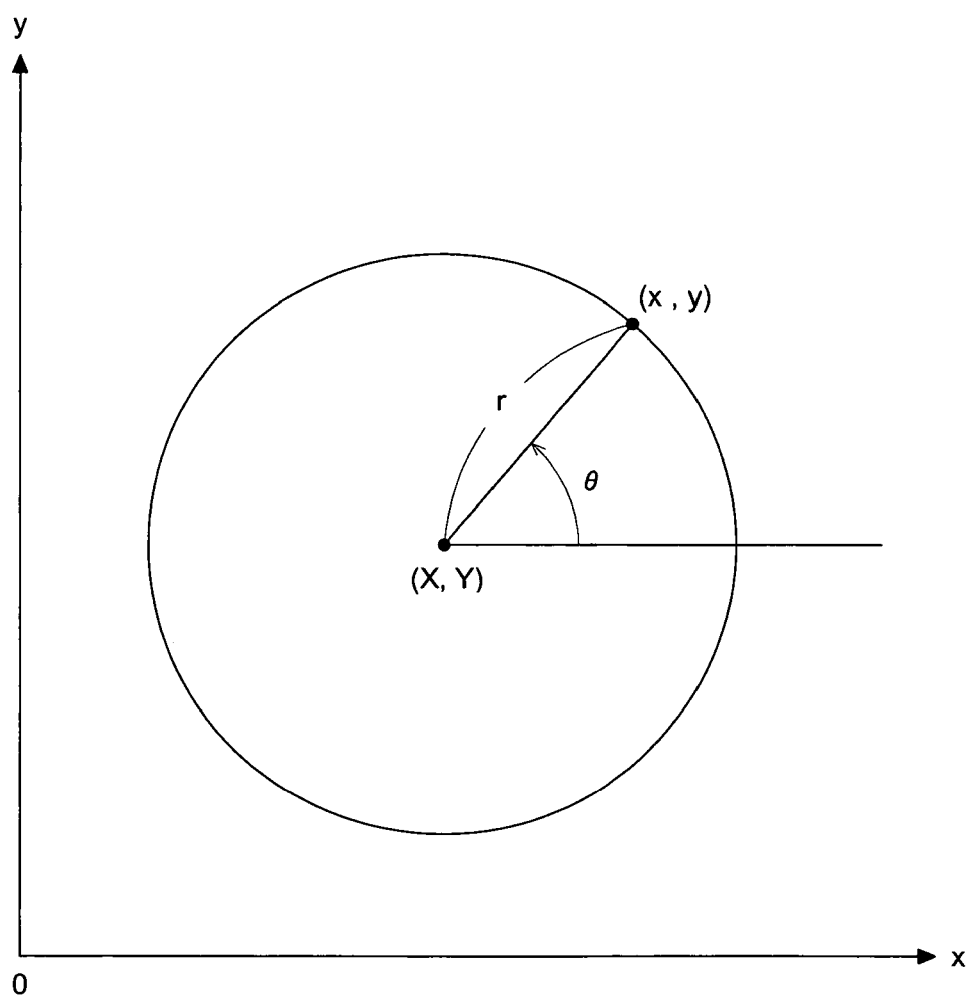
FIG. 9 is a coordinate showing the edge and its center position of the pupil.

Next, dyadic wavelet conversion is applied to the luminance signals for the pixels (x, y) whose edge intensity exceed a preset threshold, and the declination angle θ is obtained (Step C3). It is presumed that the pixels in which the edge intensity exceeds the threshold are the borders of the pupils and iris of the eyes of the face of a person. The declination angle θ which is obtained is, as shown in FIG. 9, the angle formed in the (x, y) direction with the x axis of the center of the pupil (X, Y) obtained from the edge (x, y) in the case where the pupil is assumed to be a circle with radius r.

The wavelet conversion is known as an effective method in which each of the local locus of the image is divided into frequency regions and control and highlighting is performed for each frequency region ("Wavelet and Filter Banks" by G. Strang & T. Nguyen, Wellesley-Cambridge Press (Japanese Translation also available).

An outline of the dyadic wavelet conversion will be described in the following. The dyadic wavelet conversion is described in detail in "Singularity Detection and Processing with Wavelets" by S. Mallat and W. L. Hwang, IEEE Trans. Inform. Theory 38 617 (1992) or Characterization of Signals from Multiscale Edges" By S. Mallat and S. Zhong, IEEE Trans, Pattern Anal. Machine Intel. 14 710 (1992) or A Wavelet Tour of Signal Processing 2nd" by S. Mallat, Academic Press.

The wavelet function $\psi_{i,j}(x)$ for the dyadic wavelet conversion is defined in the Equation (9).

[Equation 9]

$$\psi_{i,j}(x) = 2^{-i}\psi\left(\frac{x-j}{2^i}\right) \tag{9}$$

Note that i is a natural number.

The wavelet function for the dyadic wavelet conversion has the features described below because the minimum position movement unit is constant regardless of the level i.

The first feature is that the high frequency region component $W_i$ which is formed by the level 1 dyadic wavelet shown in Equation (10) below and each of the signal amounts for the low frequency region components $S_i$ has the same signal $S_{i-1}$ prior to conversion.

[Equation 10]

$$S_{i-1} = \sum_j \langle S_{i-1}, \psi_{i,j}\rangle \cdot \psi_{i,j}(x) + \sum_j \langle S_{i-1}, \phi_{i,j}\rangle \cdot \phi_{i,j}(x) \equiv \tag{10}$$
$$\sum_j W_i(j) \cdot \psi_{i,j}(x) + \sum_j S_i(j) \cdot \phi_{i,j}(x)$$

The second feature is that Equation (11) holds true for the relationship between the scaling function $\phi_{i,j}(x)$ and the wavelet function $\psi_{i,j}$.

[Equation 11]

$$\psi_{i,j}(x) = \frac{\partial}{\partial x}\phi_{i,j}(x) \tag{11}$$

It is to be noted that the high frequency region component $W_i$ that is created by dyadic wavelet conversion indicates the one level differential (gradient) for the low frequency region component $S_i$.

The third feature is that for $W_i \times \gamma_i$ (referred to as corrected high frequency region component hereinafter) obtained by multiplying the high frequency region component $W_i$ by the coefficient $\gamma_i$ that is set in accordance with the wavelet conversion level i, the relationship between the signal intensity levels of the corrected high frequency region components Wi and $\gamma_i$ follows a prescribed rule in accordance with the singularity of the signal conversion for the input signals.

Figure 10:
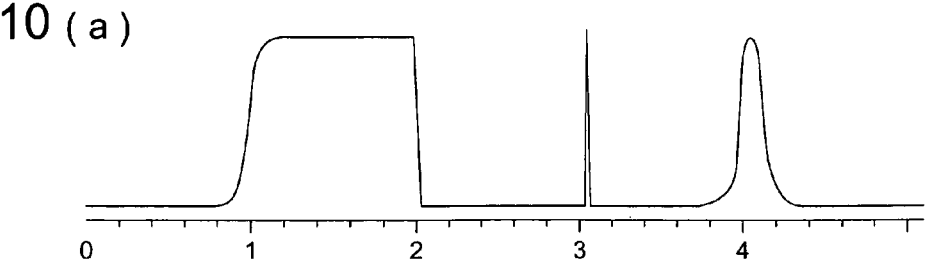
FIG. 10 shows the waveform of the input signal $S_0$, and the waveform for each level of the corrected high frequency wave components which were obtained by dyadic wavelet conversion.
Figure 10:
Figure 10:
Figure 10:
Figure 10:
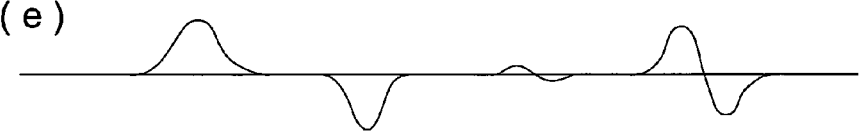

FIG. 10 shows the waveform of the input signals $S_0$ and the waveforms of the corrected high frequency region components for each level obtained by the dyadic wavelet conversion. In FIG. 10, (a) shows the input signal $S_0$; (b) shows the corrected high frequency region components $W_1$ and $\gamma_1$ which are obtained from the level 1 dyadic wavelet conversion; (c) shows the corrected high frequency region components $W_2$ and $\gamma_2$ which are obtained from the level 2 dyadic wavelet conversion; (d) shows the corrected high frequency region components $W_3$ and $\gamma_3$ which are obtained from the level 3 dyadic wavelet conversion; and (e) shows the corrected high frequency region components $W_4$ and $\gamma_4$ which are obtained from the level 4 dyadic wavelet conversion.

Examining the change in signal intensity at each level reveals that the signal intensity for the corrected high frequency region components $W_i$ and $\gamma_i$ having the gentle (differentiable) signal change shown in "1" and "4" increases to the extent that the level number i shown in (b)→(e) increases. In the input signal $S_0$, the signal intensity decreases to the extent that the level number i increases as shown in (b)→(e) for corrected high frequency region components $W_i$ and $\gamma_i$ which correspond to the signal change δ function status which shows "3".

Figures 11, 12, 13:
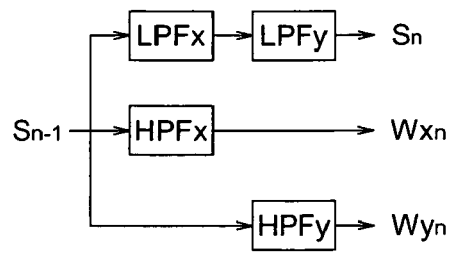
FIG. 11 shows dyadic wavelet conversion at level 1 of the two dimensional signal.
FIG. 12 shows a filter coefficient in the dyadic wavelet conversion.
FIG. 13 shows the correction coefficient $\gamma_i$ in the dyadic wavelet conversion.

The fourth feature is that the level 1 dyadic wavelet conversion in two dimensional signals such as image signals is performed using the method shown in FIG. 11. As shown in FIG. 11, in the level 1 wavelet conversion, the input signal $S_{n-1}$ is processed by an x direction low pass filter LPFx and a y direction low pass filter LPFy to thereby obtain a low frequency region component $S_n$. Also, the input signal $S_{n-1}$ is processed by an x direction high pass filter HPFx to thereby obtain a high frequency region component $Wx_n$, and the input signal $S_{n-1}$ is processed by a y direction high pass filter HPFy to thereby obtain a high frequency region component $Wy_n$.

As a result, due to the level 1 dyadic wavelet conversion the input signal $S_{n-1}$ is broken down into 2 high frequency region components $Wx_n$ and $Wy_n$ and 1 low frequency component $S_n$. The 2 high frequency region components $Wx_n$ and $Wy_n$ is equivalent to the x component and the y component of the change vector $V_n$ in the 2 dimensions of the low frequency component $S_n$. The size of the change vector $V_n$ and the declination angle $\theta_n$ is given by Equations (12) and (13) below.

[Equation 12]

$$M_n = \sqrt{Wx_n^2 + Wy_n^2} \quad (12)$$

[Equation 13]

$$\theta_n = \text{argument}(Wx_n + iWy_n) \quad (13)$$

In this embodiment, the filter for the coefficient shown in FIG. 12 is used to perform the level 1 dyadic wavelet conversion. In FIG. 12, the filter coefficient for x=0 is the filter coefficient for the pixels that are currently being processed, while the x=−1 filter coefficient is the filter coefficient for one set of pixels before the pixels that are currently being processed, and the x=1 filter coefficient is the filter coefficient one set of pixels after the pixels that are currently being processed (the same applies hereinafter).

In the dyadic wavelet conversion, the filter coefficient varies, and the coefficient for each level filter level n is $2^{n-1}-1$ which is zero, is inserted between each of the coefficients for the level 1 filter. (Refer to the reference documents listed above). In addition, the value shown in FIG. 13 is used for the correction coefficient $\gamma_i$ which is set based on level i of the dyadic wavelet conversion.

Figure 8:
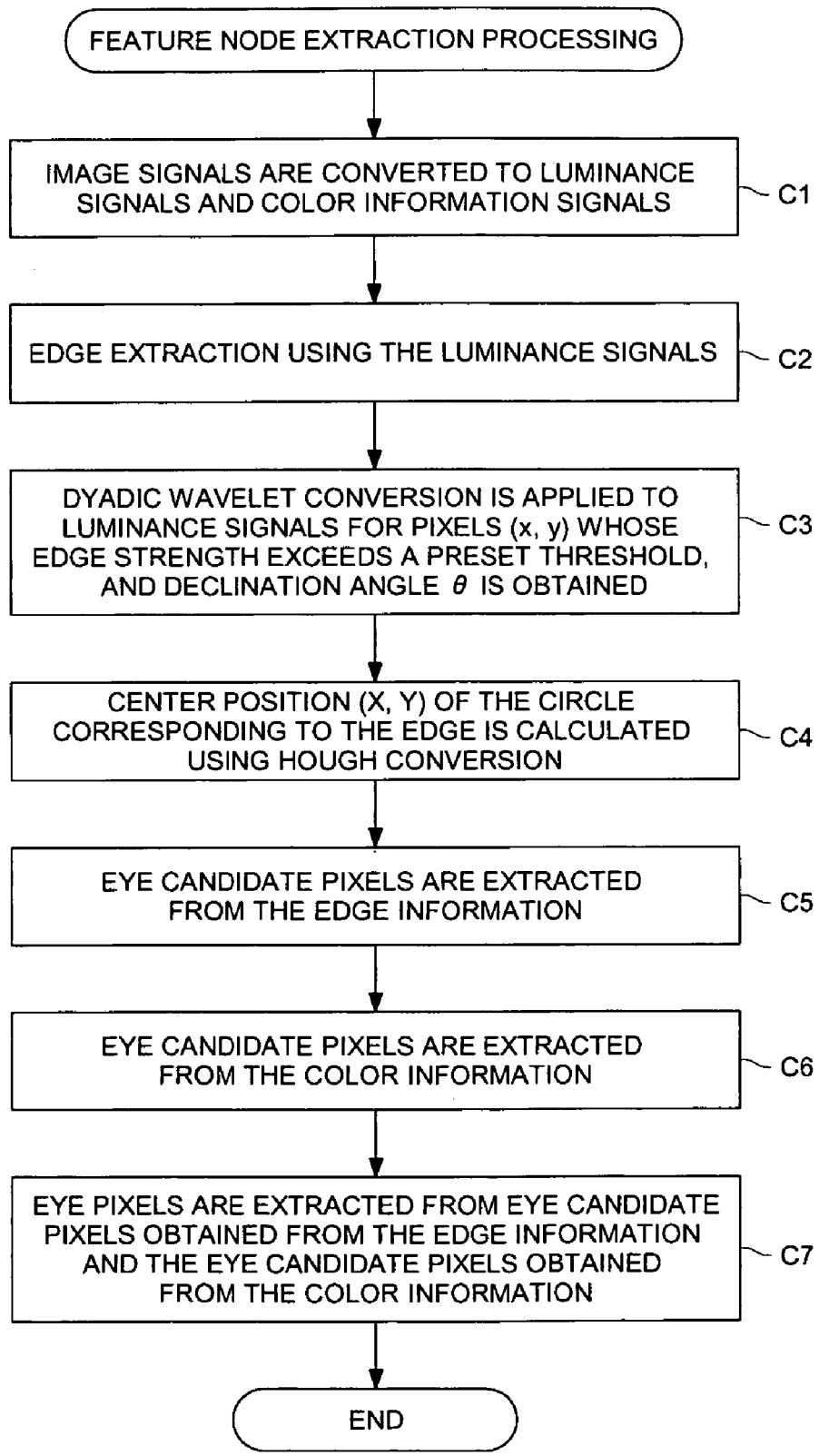
FIG. 8 is a flowchart showing the feature region extraction processing.

Next, as shown in FIG. 8, the pixels (x, y) for which the edge intensity is above the threshold value, Hough conversion is used, and the center position (X, Y) of the circle corresponding to the edge is calculated with Equation (14) below, and selected as the center position candidate for the pupil (Step C4).

[Equation 14]

$$X = x - r \cos \theta$$

$$Y = y - r \sin \theta \quad (14)$$

The declination angle $\theta_n$ calculated for the pixels (x, y) for which the edge intensity is above the threshold value is used as θ in this equation.

The Hough conversion is a method in which a line comprising sectors that can be described in the form of an Equation is extracted from the image and can be used not only for straight lines, but also for circles or ellipses. Hough conversion is also effective in the case where there is breakage in the sector of the line as well as when there is a lot of noise included, and, can be used in various industrial fields such as those of U.S. Pat. No. 3,069,654 specification, Japanese Patent Application Laid-Open No. 7-91914 publication, Japanese Patent Application Laid-Open No. 2002-183739 publication, Japanese Patent Application Laid-Open No. 6-203156 publication, Japanese Patent No. 2856539, and Japanese Patent No. 264636.

The constant r for the component pixels of the face candidate region is compared with the table and determined separately. The eye can be accurately detected by setting the range r of the approximate size of the eyes based on the number of pixels comprising the face candidate region, or in other words the size and resolution of the face.

Next, the most frequently selected position of the center position candidates (X1, Y1) and the second most frequently selected position (X1, Y1) in the circle corresponding to each edge are determined. (X1, Y1) and (X1, Y1) herein, indicate the center position of the pupils in the horizontal direction of the face of a person and with (X1, Y1) and (X1, Y1) as the center, the pixels included in the range of the radius r are used as the eye candidate pixels (pupil candidate pixels) obtained from the edge information (Step C5).

It is assumed that there are 2 eyes in the face candidate region, but in the case where the second most frequently selected position is unclear, the face may be determined that the face is in the horizontal direction or that one eye is hidden and thus there is only one eye.

Next, pixels having values for chromaticness, hue and brightness of a prescribed range are extracted (Step C6). This is used as the eye candidate pixels (pupil candidate pixel) obtained from the color information.

The pixels in both the eye candidate pixels (pupil candidate pixels) obtained from the edge information and the eye candidate pixels (pupil candidate pixels) obtained from the color information are extracted as the eye pixels (pupil pixels) (Step C7). Moreover, as for the extraction of the mouth pixels, it is effective to use dyadic wavelet conversion to extract the edge information from luminance signals of image signals of the mouth candidate pixels that judged to be a mouth pixel if the color values of the pixels of the extracted edge position is the range of the color value correspond to the color of mouth (for example, spectrum correspond to the color of a lip). And, the technique of performing to binarizing the extracted edge image or original image, acquiring the position information on the mouth candidate pixels by applying the template matching to the binary image, and extracting a mouth pixel from the position information is also effective.

The feature region extraction process ends after this.

In this manner, in the case where the face candidate region in the eye extraction processing is larger than a prescribed value, or in other words when the pupil has a substantially circular shape, by using the Hough conversion, the eye can be extracted with high accuracy. By estimating the range of the size of the pupil from the size of the face candidate region, there is no great increase in the processing load, and the accuracy of the eye detection is improved.

Figure 14:
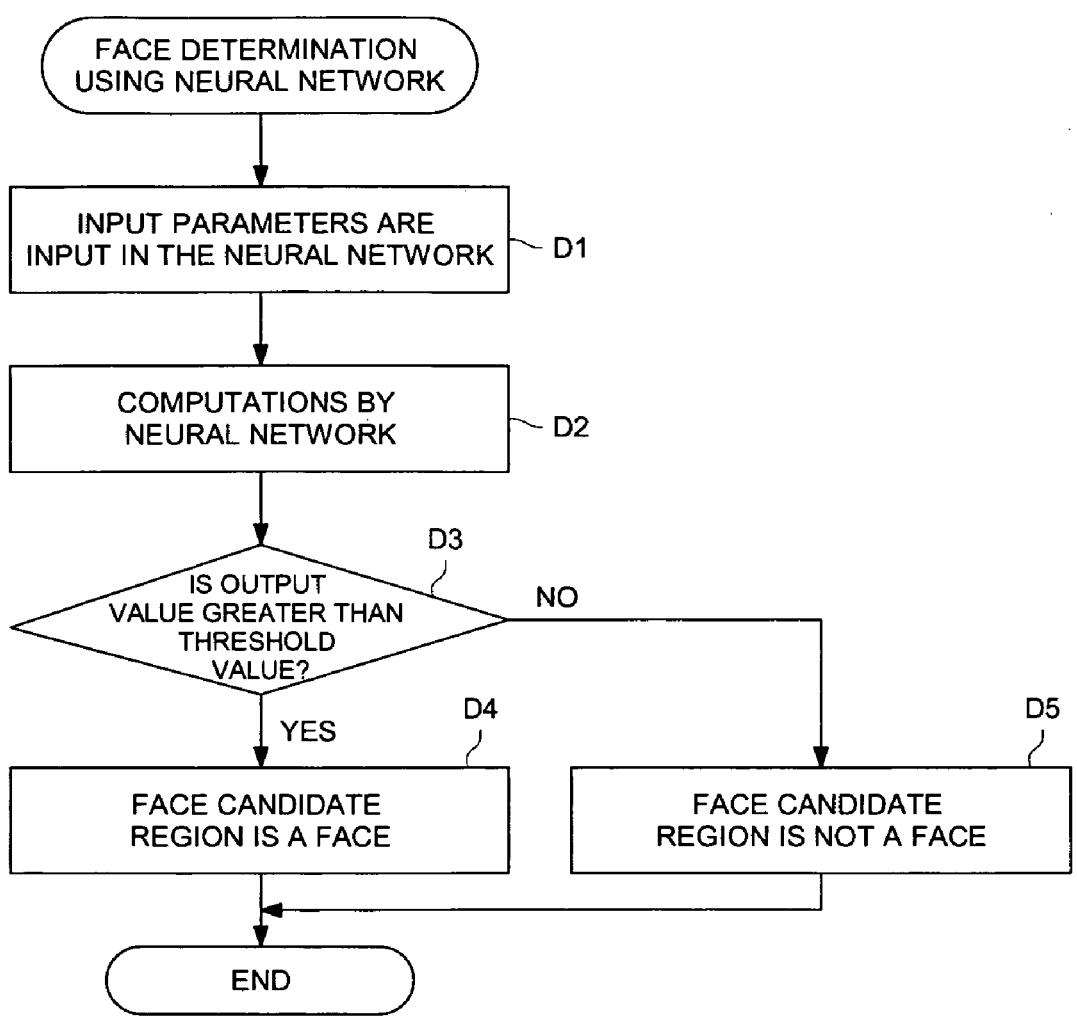
FIG. 14 is a flowchart showing face determining processing using the neural network.

Next, the face detection processing using the neural network (Step B5 in FIG. 5) will be described in detail with reference to FIG. 14. The neural network used herein comprises 3 layers which are the input layer, the middle layer and the output layer, and the number of elements for the input layer and the output layer are determined from the number of parameters for input and the number of parameters for output, and also the suitable number of elements for the middle layer is determined from the number of elements in the input and output layers. In this embodiment there is one middle layer and the number of elements in the input layer, middle layer and output layer are 5, 7 and 1. However, the structure of the neural network may be such that there are more than 2 middle layers, and the number of elements in each layer may also be such that the recognition rate is as high as possible.

First the input parameters are input in the input layer of the neural network (Step D1). The input parameters are area ratio of the eyes and mouth calculated in Step B4 of FIG. 5, the average hue value (obtained separately) for the face candidate region, the average hue value (obtained separately) for the face candidate region, and the ratio of the shortest diagonal line and the longest diagonal line passing the center of gravity for the face candidate region (also obtained separately).

In addition to the area ratio for the eye and mouth which is a feature of this invention, the parameters input in the neural network preferably includes a characterizing parameters such as the color of the face candidate region within a range allowed by processing capacity and processing time and a parameter which indicates the face candidate region and the configuration thereof. Examples of the parameters that characterize the color of the face candidate region include the average values for the color saturation, hue and brightness of the face candidate region, or the average values for L*a*b and L*u*v, but the examples are not limited thereto, and methods for expressing color value that are known in the industry may be used. Examples of parameters for the face candidate region and configurations thereof that may be used include various parameters such as the ratio of the long axis to the short axis in the ellipse which make the internal area of the face candidate region a maximum, or the extent of roundness and the like.

The training data in the neural network is created using images that have being sampled in accordance with the appearance frequency of scenes photographed by the typical user. The face candidate regions are extracted from the sampled image using the same process flow for the face determining processing, and the parameter input into the neural network is calculated. Because the result of this calculation along with the training data (for example 1 if it a face and 0 if it is not a face) corresponding to the face candidate regions are used for training with the BP method, the coefficient (weight coefficient $w_i$) used on the network at the time of determination can be decided.

The computations are then done by the neural network (Step D2), and if the output value (likeness to a face) output from the output layer is above the prescribed threshold value (YES in Step D3) the face candidate region is determined to be a face (Step D4). If the output value is less than the prescribed threshold value (NO in Step D3), the face candidate region is determined to be not a face (Step D5).

Subsequently the face determination process performed by the neural network ends.

In the case where the eyes and mouth are detected using only color information as in the case of the prior art, when the extraction conditions are set with few limits such that extraction can be done for various scenes, not only the eyes and mouth, but structures other than the eyes and the mouth such as the shadow part of the face outline, hair having a similar color, and in the case where image resolution is high, color unevenness of the skin and the like appear in the extraction. Conversely, if the extraction conditions are very limited, it becomes impossible to handle many kinds of scenes and this is unsatisfactory.

When the eyes and mouth are extracted based on only edge information, because the eyes and mouth are not distinct in group pictures and low resolution images, extraction accuracy is low.

In the image processing apparatus 1, the extraction conditions are set to cover a wide range so that extraction of the eyes and the mouth will be included for any scene from color information. Because extraction in error is eliminated, by using the edge information also, when the eyes and mouth appear as blocks as is the case for face candidate regions with low resolution in which the original images are not maintained, and in small face candidate regions in which the number of component pixels is small, as well as in high resolution face candidate regions and face candidate regions having a sufficiently large amount of pixels, the eyes and mouth can be extracted with high accuracy. Thus accuracy is high regardless of the size or resolution of the face candidate region or the orientation or expression of the face or the exposure state, and face determination processing can be performed using common parameters.

In addition, when the size of the face candidate region exceeds the prescribed value, by using the Hough conversion which is highly resistant to edge breaking, the eyes which have an elliptical shape is extracted from the face candidate region with high accuracy. Also by using the dyadic wavelet conversion, the gradient direction of the edge can be obtained accurately, and thus by applying the Hough conversion, the feature region of the eyes and the like can be even more accurately extracted.

Also, a neural network is used in which the area ratio for the eyes and mouth are used as the input signals, and a parameter which indicates likeness to a face is used as the output signals, and by determining whether the face candidate region is a face, the processing load is reduced and the face determination can be performed simply. By providing training data to the neural network and carrying out training, likeness to a face can be determined and thus the variance in face images having various features under various photographing conditions, or vagueness and error in extracting the face candidate region is absorbed while the image that is output to the printer or monitor, and face determination can be performed optimally in which the non-linear characteristics are close in the determination of a person viewing the image.

Furthermore, by using the neural network, in the case where recognition rate is low due to changes in the direction, regional differences, and changes in the environment of the scene to be subjected to determination in the image processing apparatus 1 and as a result fine adjustment is necessary, new training data can be included or the training data replaced to cause re-training and thus a high recognition rate can be maintained without changing the system.

Also, because the image processing conditions are determined based on the results of the face determination, and image processing is performed for the face candidate regions that have been determined to be faces based on the image processing conditions, correction processing for improving the appearance of the face in particular can be performed.

It is to be noted that the embodiment described above is an example of a preferable image processing apparatus of this invention, and this invention is not to be limited thereby. The detailed structure and function of the parts comprising the image processing apparatus may be suitably modified without departing from the scope of this invention.

According to the inventions, a color digital image is obtained, a face candidate region is extracted from the color digital image, eye pixels and mouth pixels are extracted from the face candidate region, the area ratio for eyes and mouth in the face candidate region is calculated based on eye pixels and mouth pixels that were extracted, and a determination is made as to whether the face candidate region is a face based on the area ratio of the eyes and mouth in the face candidate region, and thus a highly accurate determination can be made as to whether the face candidate region is a face, regardless of the size or resolution of the face candidate region.

And according to the inventions, the extraction conditions for extracting the eye pixels and the mouth pixels from the face candidate region are determined based on the size of the face candidate region, and the eye pixels and the mouth pixels are extracted from the face candidate region based on the extraction conditions, and thus the conditions for extraction the eye pixels and mouth pixels can be changed based on the size of the face candidate region. Thus, for low resolution face candidate region or for face candidate regions in which the number of pixels comprising the region is few, and also for high resolution face candidate regions or for face candidate regions comprising a sufficient number of pixels, highly accurate face determination can be done.

And according to the inventions, the eye pixels and the mouth pixels are extracted from the face candidate region with high accuracy using both color information and edge information of the face candidate region.

When a digital image which is a nature image is being handled, sometimes there is breakage when extracting the edges that form the outline of the eyes and mouth, but according the inventions of claims 4, 11 and 18, the eye pixels and/or the mouth pixels are extracted from the face candidate region with high accuracy by using the Hough conversion which is highly resistant to edge breaking. In particular, the eyes which have a substantially circular or elliptical shape can be extracted from the face candidate region with high accuracy. This is effective when the face candidate region is larger than a prescribed size.

And according to the inventions by using dyadic wavelet conversion, the edge information can be extracted with high accuracy. Also, the edge gradient direction can be obtained with high accuracy and thus by applying Hough conversion, the feature region can be extracted with even more accuracy.

And according to the inventions, a determination is made as to whether the face candidate region is a face using a neural network in which the area ratio of the eyes and mouth is used as the input signals and a parameter indicating likeness to a face is used as the output signals, and by making a determination as to whether the face candidate region is a face, processing load is reduced and a simple face determination can be performed.

Furthermore, according to the inventions, the image processing conditions are determined based on the face determination results and image processing is performed for at least a portion of the color digital image based on the image processing conditions, and thus correction processing for improving the appearance of the face in particular can be performed.

What is claimed is:

1. An image processing method, comprising steps of:
    obtaining a color digital image data;
    extracting face candidate region from the color digital image data;
    extracting the feature region from the face candidate region, wherein the feature region are eye pixels and mouth pixels;
    calculating the area ratio for eyes and the area ratio for mouth in the face candidate region based on eye pixels and mouth pixels which were extracted; and
    determining whether the face candidate region is a face based on the area ratio of the eyes and mouth in the face candidate region.

2. The image processing method of claim 1, further comprising step of:
    determining the extraction conditions in the feature region extraction step based on the size of the face candidate region, wherein in the feature region extraction step, the eye pixels and the mouth pixels are extracted from the face candidate region based on the extraction conditions.

3. The image processing method of claim 1, wherein in the feature region extraction step, eye pixels and mouth pixels are extracted from the face candidate region based on color information and edge information of the face candidate region.

4. The image processing method of claim 3, wherein the eye pixels and/or the mouth pixels are extracted from the face candidate region using the Hough conversion in the feature region extraction step.

5. The image processing method of claim 3, wherein in the feature region extraction step, the edge information is extracted from the face candidate region using dyadic wavelet conversion.

6. The image processing method of claim 1, wherein in the face determining step, a determination is made as to whether the face candidate region is a face using a neural network.

7. The image processing method of claim 1, further comprising steps of:
    determining the image processing conditions based on the determination results of the face determination step;
    correction-processing at least a portion of the color digital image data based on the image processing conditions.

8. The image processing method of claim 1, further comprising step of:
    determining whether the eye candidate region and the mouth candidate region are eye and mouth based on the area ratio of the eyes and mouth in the face candidate region.

9. An image processing device comprising:
    an image retrieving section for retrieving a color digital image data;
    a face candidate region extraction section for extracting a face candidate region from the color digital image data;
    a feature region extraction section for extracting eye pixels and mouth pixels from the face candidate region;
    an area ratio calculation section for calculating the area ratio for eyes and the area ratio for mouth in the face candidate region based on the eye pixels and mouth pixels that were extracted; and
    a face determination section for determining whether the face candidate region is a face based on the area ratio of the eyes and mouth in the face candidate region.

10. The image processing device of claim 9, further comprising:
    an extraction condition determining section for determining the extraction conditions in the feature region extraction section based on the size of the face candidate region, wherein the feature region extraction section extracts the eye pixels and the mouth pixels from the face candidate region based on the extraction conditions.

11. The image processing apparatus of claim 9, wherein the feature region extraction section extracts the eye pixels and the mouth pixels from the face candidate region based on color information and edge information of the face candidate region.

12. The image processing apparatus of claim 11, wherein the eye pixels and/or the mouth pixels are extracted from the face candidate region using the Hough conversion in the feature region extraction section.

13. The image processing apparatus of claim 11, wherein the feature region extraction section extracts the edge information from the face candidate region using dyadic wavelet conversion.

14. The image processing apparatus of claim 9, wherein the face determining section determines whether the face candidate region is a face using a neural network.

15. The image processing apparatus of claim 9, further comprising a correction processing section in which the image processing conditions are determined based on the determination results of the face determination section and image processing is performed for at least a portion of the color digital image data based on the image processing conditions.

16. The image processing method of claim 9, further comprising:
    a feature region determination section for determining whether the eye candidate region and the mouth candidate region are eye and mouth based on the area ratio of the eyes and mouth in the face candidate region.

17. A computer-readable medium storing an image processing program to control a computer to function as an image processing device, wherein the image processing program causes the computer to perform steps comprising:

image retrieving for retrieving a color digital image data;

face candidate region extracting for extracting a face candidate region from the color digital image data;

feature region extracting for extracting eye pixels and mouth pixels from the face candidate region;

area ratio calculating for calculating an area ratio of eyes and an area ratio of mouth to the face candidate region based on the eye pixels and mouth pixels which were extracted; and face determining for determining whether the face candidate region is a face based on the area ratio of the eyes and the area ratio of the mouth to the face candidate region.

18. The computer-readable medium claim 17, wherein the steps further comprise, extraction condition determining for determining an extraction condition in the feature region extraction section based on the size of the face candidate region, wherein the feature region extraction section extracts the eye pixels and the mouth pixels from the face candidate region based on the extraction condition.

19. The computer-readable medium of claim 17, wherein the feature region extracting comprises extracting the eye pixels and the mouth pixels from the face candidate region based on color information and edge information of the face candidate region.

20. The computer-readable medium of claim 19, wherein the eye pixels and/or the mouth pixels are extracted from the face candidate region using the Hough conversion in the feature region extraction section.

21. The computer readable-medium of claim 19 wherein the feature region extracting comprises extracting the edge information from the face candidate region using dyadic wavelet conversion.

22. The computer-readable medium of claim 17, wherein the face determining comprises determining whether the face candidate region is a face using a neural network.

23. The computer-readable medium of claim 17, wherein the steps further comprise, performing a correction processing in which image processing conditions are determined based on the determination results of the face determining and image processing for at least a portion of the color digital image data is performed based on the image processing conditions.

24. The computer-readable medium of claim 17, wherein the steps further comprise, feature region determining for determining whether the eye candidate region and the mouth candidate region are eye and mouth based on the area ratio of the eyes and the area ratio of mouth to the face candidate region.

* * * * *